United States Patent
Iorga et al.

(10) Patent No.: US 11,115,334 B1
(45) Date of Patent: Sep. 7, 2021

(54) OPTIMIZED NETWORK LATENCY USING IN-BAND TELEMETRY

(71) Applicant: LENOVO Enterprise Solutions (Singapore) PTE. LTD., New Tech Park (SG)

(72) Inventors: Radu M. Iorga, Bucharest (RO); Roberto H. Jacob Da Silva, Oak Park, CA (US); Corneliu-Ilie Calciu, Bucharest (RO)

(73) Assignee: LENOVO Enterprise Solutions (Singapore) PTE. LTD., New Tech Park (SG)

(*) Notice: Subject to any disclaimer, the term of this patent is extended or adjusted under 35 U.S.C. 154(b) by 0 days.

(21) Appl. No.: 16/836,446

(22) Filed: Mar. 31, 2020

(51) Int. Cl.
| | |
|---|---|
| H04L 12/801 | (2013.01) |
| H04L 12/823 | (2013.01) |
| H04L 12/833 | (2013.01) |
| H04L 12/26 | (2006.01) |
| H04L 12/863 | (2013.01) |
| H04L 12/851 | (2013.01) |
| H04L 12/861 | (2013.01) |

(52) U.S. Cl.
CPC .............. *H04L 47/11* (2013.01); *H04L 43/16* (2013.01); *H04L 47/2441* (2013.01); *H04L 47/29* (2013.01); *H04L 47/31* (2013.01); *H04L 47/32* (2013.01); *H04L 47/50* (2013.01); *H04L 49/90* (2013.01)

(58) Field of Classification Search
None
See application file for complete search history.

(56) References Cited

U.S. PATENT DOCUMENTS 5,268,962 A * 12/1993 Abadi ................. H04L 63/1441
380/284
2002/0176363 A1* 11/2002 Durinovic-Johri ... H04L 47/122
370/237

(Continued)

OTHER PUBLICATIONS

Netronome, "Barefoot Networks and Netronome Demonstrate End-to-End In-Band Network Telemetry for 5G NFV Deployments", Feb. 27, 2017, pp. 1-7.

(Continued)

*Primary Examiner* — Anh Ngoc M Nguyen
(74) *Attorney, Agent, or Firm* — Kunzler Bean & Adamson; Bruce R. Needham

(57) ABSTRACT

An apparatus for reporting node congestion of a queue of an egress port and changing to a different queue is disclosed. The apparatus includes a network node that includes a controller. The controller is configured to determine a level of congestion of a designated queue of an egress port of the network node in a communication pathway between a sending host sending data packets to a receiving host in response to receiving a telemetry packet seeking telemetry data for packets being transmitted between the sending host and the receiving host. The designated queue is designated for queuing data packets for the egress port. The controller is configured to add the level of congestion to the telemetry packet in response to determining that the level of congestion indicates that the designated queue is congested and to transmit the telemetry packet to a next destination on the communication pathway.

20 Claims, 7 Drawing Sheets

(56) References Cited

U.S. PATENT DOCUMENTS

| | | | | |
|---|---|---|---|---|
| 2003/0115480 | A1* | 6/2003 | McDysan | H04L 63/0272 726/36 |
| 2006/0056413 | A1* | 3/2006 | Ikeda | G06F 9/547 370/392 |
| 2014/0006479 | A1* | 1/2014 | Maloo | H04L 67/2814 709/203 |
| 2014/0169189 | A1* | 6/2014 | Kalkunte | H04L 43/10 370/252 |
| 2017/0048144 | A1* | 2/2017 | Liu | H04L 12/413 |
| 2017/0289048 | A1* | 10/2017 | Chao | H04L 49/505 |
| 2017/0339075 | A1* | 11/2017 | Arad | H04L 49/9084 |

OTHER PUBLICATIONS

Broadcom, BroadView-SP102, "Instrumentation Agent", Nov. 15, 2018, pp. 1-160.
Brockners, et al., "Data Fields for In-situ OAM" draft-brockners-inband-oam-data-04, Mar. 29, 2017, pp. 1-25.
Brockners, et al., "Requirements for In-situ OAM" draft-brockners-inband-oam-requirments-03, Mar. 13, 2017, pp. 1-24.
Brockners, et al., "Encapsulations for In-situ OAM Data" draft-brockners-inband-oam-transport-03, Mar. 12, 2017, pp. 1-21.
Brockners, et al., "Proof of Transit" draft-brockners-proof-of-transit-03, Mar. 13, 2017, pp. 1-23.
Lapukhov, et al., "Data-plane probe for in-band telemetry collection" draft-lapukhov-dataplane-probe-00, Mar. 18, 2016, pp. 1-16.
Tal Mizrahi, et al., Marvell, "Network Telemetry Solutions for Data Center and Enterprise Networks", Mar. 2018, pp. 1-14.
Hartmann, Dennis, Network World, Virtualization Jungle, "Weighted Tail Drop", https://www.networkworld.com/article/2236466/weighted-tail-drop.html, dated Jul. 16, 2009, pp. 1-3.

* cited by examiner

OPTIMIZED NETWORK LATENCY USING IN-BAND TELEMETRY

FIELD

The subject matter disclosed herein relates to in-band telemetry and more particularly relates to detecting, using in-band telemetry, congestion of a queue of a network node and redirecting the data flow to a different queue.

BACKGROUND

In-band telemetry is a solution to monitor network latency as well as the path a flow takes. It does this by stamping packets along the path with useful information. This information is sent to a centralized network controller for processing. Usually, when latency is discovered, solutions to the latency involve changing networking equipment or forcing another route for data to flow from a sending host to a receiving host. One source of latency occurs when a queue of an egress port of a network node servicing the particular data flow from the sending host to the receiving host becomes congested.

BRIEF SUMMARY

An apparatus for reporting node congestion of a queue of an egress port and changing to a different queue is disclosed. The apparatus includes a network node that includes a controller. The controller is configured to determine a level of congestion of a designated queue of an egress port of the network node in a communication pathway between a sending host sending data packets to a receiving host in response to receiving a telemetry packet seeking telemetry data for packets being transmitted between the sending host and the receiving host. The designated queue is designated for queuing data packets for the egress port. The controller is configured to add the level of congestion to the telemetry packet in response to determining that the level of congestion indicates that the designated queue is congested and to transmit the telemetry packet to a next destination on the communication pathway.

A method for sending a command to change a data flow to a different queue after determining that a designated queue of an egress port of a network node includes receiving, by use of a processor, a telemetry packet from an egress network node. The egress network node is connected to a receiving host, where the egress network node is within a communication pathway between a sending host and the receiving host. A data flow of data packets being transmitted from the sending host to the receiving host are queued in a designated queue of an egress port of a network node in the communication pathway. The method includes determining, by use of a processor, that the telemetry packet indicates that the designated queue is congested, and sending a command to the network node to change the data flow from the designated queue to a different queue of the egress port such that data packets from transmitted between the sending host and the receiving host are queued in the different queue.

A program product for sending a command to change a data flow to a different queue after determining that a designated queue of an egress port of a network node includes a computer readable storage medium and program code. The program code is configured to be executable by a processor to perform operations. The operations include receiving a telemetry packet from an egress network node. The egress network node is connected to a receiving host where the egress network node is within a communication pathway between a sending host and the receiving host. A data flow of data packets being transmitted from the sending host to the receiving host are queued in a designated queue of an egress port of a network node in the communication pathway. The operations include determining that the telemetry packet indicates that the designated queue is congested, and sending a command to the network node to change the data flow from the designated queue to a different queue of the egress port such that data packets from transmitted between the sending host and the receiving host are queued in the different queue.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1:
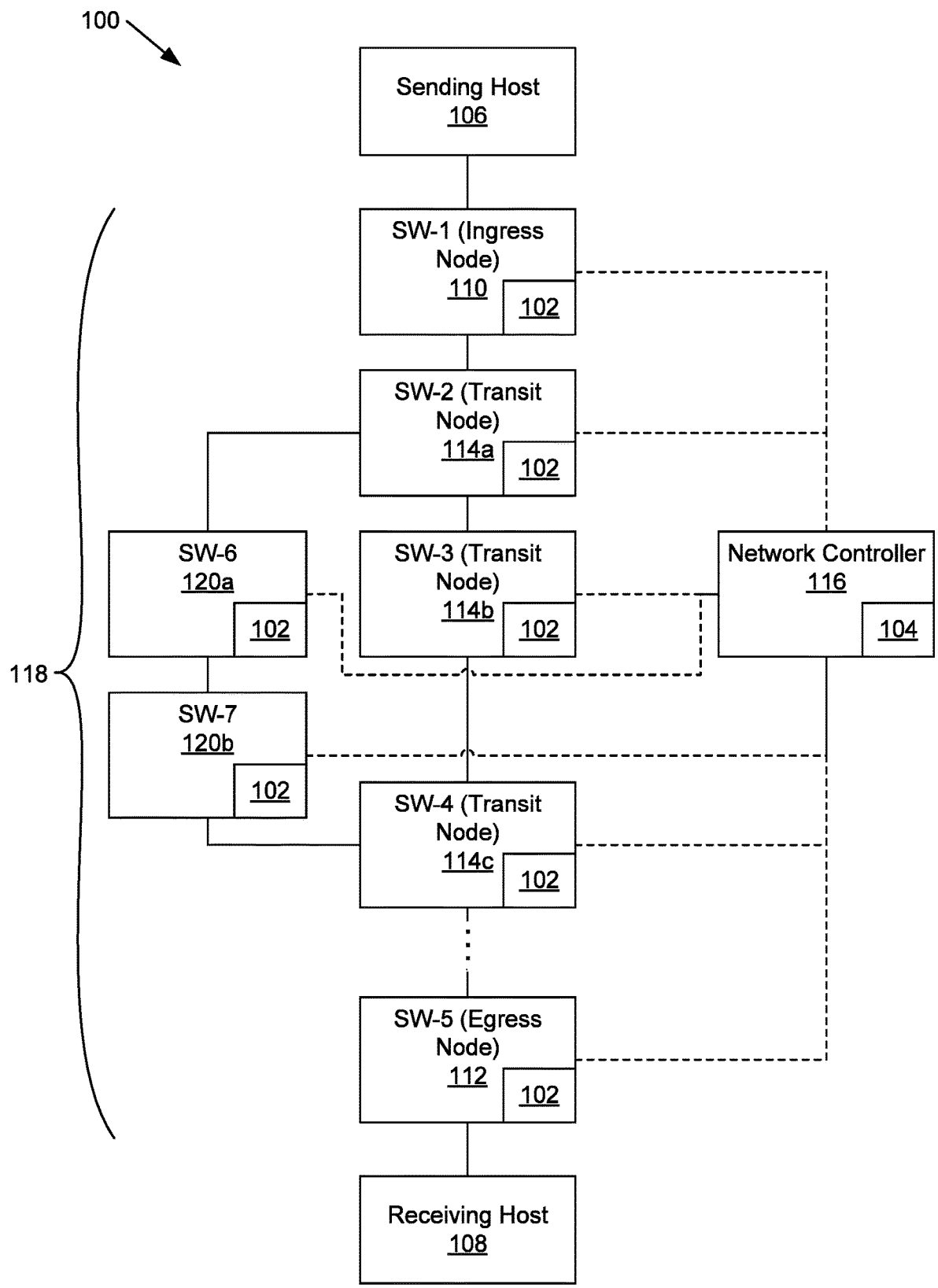
FIG. 1 is a schematic block diagram illustrating one embodiment of a data network with network nodes connecting a sending host and a receiving host where the network nodes are connected to a network controller and the network nodes each include a telemetry apparatus.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays ("FPGAs"), programmable array logic, programmable logic devices or the like.

Modules may also be implemented in code and/or software for execution by various types of processors. An identified module of code may, for instance, comprise one or more physical or logical blocks of program code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

An apparatus for reporting node congestion of a queue of an egress port and changing to a different queue is disclosed. The apparatus includes a network node that includes a controller. The controller is configured to determine a level of congestion of a designated queue of an egress port of the network node in a communication pathway between a sending host sending data packets to a receiving host in response to receiving a telemetry packet seeking telemetry data for packets being transmitted between the sending host and the receiving host. The designated queue is designated for queuing data packets for the egress port. The controller is configured to add the level of congestion to the telemetry packet in response to determining that the level of congestion indicates that the designated queue is congested and to transmit the telemetry packet to a next destination on the communication pathway.

In some embodiments, the controller is further configured to determine a level of congestion of a plurality of queues of the egress port and the controller adds a level of congestion of each of the plurality of queues of the egress port to the telemetry packet. In other embodiments, the controller determines the designated queue for queuing data packets based on a header of data packets being transmitted from the sending host to the receiving host. In other embodiments, the controller determines the designated queue of the egress port from a Differentiated Services Code Point ("DSCP") field in the header of the data packets.

In some embodiments, the controller is further configured to receive a command to reroute data packets being transmitted between the sending host and the receiving host from the designated queue to a different queue of the egress port and to redirect data packets from the designated queue to the different queue of the egress port in response to receiving the command to reroute data packets being transmitted between the sending host and the receiving host to the different queue. In other embodiments, the command to reroute the data packets being transmitted between the sending host and the receiving host includes receiving an additional data packet being transmitted from the sending host to the receiving host with a packet header designating the different queue.

In other embodiments, the packet header designating the different queue includes a DSCP field in the header of each of the additional data packet with a different priority level than a DSCP priority level designating the designated queue. In other embodiments, the command to reroute a data flow of the data packets being transmitted between the sending host and the receiving host includes receiving the command from a network controller to change the data flow from the designated queue to a different queue for the egress port. In other embodiments, a network controller sending the command is a same network controller that initiated the telemetry packet and the network controller communicates directly the command to the network node to change the data flow from the designated queue to a different queue of the egress port.

In some embodiments, determining the designated queue is congested includes determining that a level of congestion of the designated queue meets or exceeds a congestion threshold. In other embodiments, determining the level of congestion of the designated queue includes determining that the level of congestion is a value between a minimum congestion level and a maximum congestion level wherein the level of congestion comprises a percentage between zero percent and 100 percent.

A method for sending a command to change to a different queue after determining that a designated queue of an egress port of a network node includes receiving, by use of a processor, a telemetry packet from an egress network node. The egress network node is connected to a receiving host, where the egress network node is within a communication pathway between a sending host and the receiving host. A data flow of data packets being transmitted from the sending host to the receiving host are queued in a designated queue of an egress port of a network node in the communication pathway. The method includes determining, by use of a processor, that the telemetry packet indicates that the designated queue is congested, and sending a command to the network node to change the data flow from the designated queue to a different queue of the egress port such that data packets from transmitted between the sending host and the receiving host are queued in the different queue.

In some embodiments, sending the command includes sending the command to the sending host, where the command modifies headers of data packets transmitted from sending host to the receiving host to change the data flow from the designated queue to the different queue. In other embodiments, each network node along the communication pathway switches from the designated queue to the different queue. In other embodiments, modifying the headers comprises modifying a service level in a Differentiated Services Code Point ("DSCP") field of the headers.

In some embodiments, sending the command includes sending the command directly to the network node with the designated queue that is congested, where the command directs the network node with the designated queue that is congested to change the data flow to the different queue. In other embodiments, network nodes within the communication pathway other than the network node with the designated queue that is congested continue to direct data packets to the designated queue of the network node's respective egress port. In other embodiments, sending the command includes sending the command using a network management protocol different than a networking protocol for transmitting data packets. In other embodiments, the received telemetry packet includes a level of congestion of a plurality of queues of the egress port and sending the command includes sending the command to change the data flow from the designated queue of the egress port to a different queue of the egress port that is not congested.

A program product for sending a command to change to a different queue after determining that a designated queue of an egress port of a network node includes a computer readable storage medium and program code. The program code is configured to be executable by a processor to perform operations. The operations include receiving a telemetry packet from an egress network node. The egress network node is connected to a receiving host where the egress network node is within a communication pathway between a sending host and the receiving host. A data flow of data packets being transmitted from the sending host to the receiving host are queued in a designated queue of an egress port of a network node in the communication pathway. The operations include determining that the telemetry packet indicates that the designated queue is congested, and sending a command to the network node to change the data flow from the designated queue to a different queue of the egress port such that data packets from transmitted between the sending host and the receiving host are queued in the different queue.

FIG. 1 is a schematic block diagram illustrating one embodiment of a data network 100 with network nodes 118, which include a first switch (SW-1) which is an ingress node 110, a fifth switch (SW-5) which is an egress node 112, switches SW-2, SW-3, and SW-4 which are transit nodes 114a-c (generically or collectively "114"), and switches SW-6 120a and SW-7 120b (generically or collectively "120") connecting a sending host 106 and a receiving host 108 where the network nodes 118 are connected to a network controller 116 and the network nodes 118 each include a telemetry apparatus 102. The network controller 116 includes a telemetry analysis apparatus 104. The data network 100 is described in detail below.

The data network 100 includes a sending host 106 and a receiving host 108, which are computing devices connected to network nodes 118 of the data network 100. The computing devices may be a host, a server, a workstation, a portable electronic device, etc. For example, the data network 100 may be in a data center, may be part of a computer network of a company, or other data network where a network controller communicates with each network node 118. In the embodiments described herein, in-band refers to data flows, telemetry information, etc. that are controlled by the network controller 116 rather than external networks administered by various parties. For example, the sending host 106 and/or receiving host 108 may be part of multi-tenant servers with virtual machines each accessed by a client. In some embodiments, the sending host 106 and the receiving host 108 are computing devices configured for user access with a direct data connection to the ingress node 110 or egress node 112. In some embodiments, the data network 100 includes a connection to one or more external networks, such as the Internet, a wide-area-network, a cellular network, and the like.

The network nodes 118, are data transmission devices that facilitate receiving and sending data packets from the sending host 106 to the receiving host 108. A network node 118 may be a switch, a router or other transport device. In some embodiments, the network nodes 118 are layer-4 devices where layer-4 is the fourth layer in the Open Systems Interconnection ("OSI") Model. In other embodiments, the switches SW-1 to SW-7 are switches, routers or other devices with layer-4 capabilities. While seven switches SW-1 to SW-7 are depicted in FIG. 1, the data network 100 may include more switches or less switches. The network nodes 118 typically include a discovery mechanism that discovers connected network nodes 118 and other devices, such as the sending host 106 and receiving host 108 where information about the connected devices 106, 108, 118 are stored in a routing table. The routing table is some type of data structure, such as a register, a database, etc. Typically, the routing table includes whether or not a particular device, such as the sending host 106 or receiving host 108 are directly connected to a network node 118.

The routing table may also include a particular egress port of a network node 118 that connects to a downstream network node 118. For example, switch SW-2 114a may be connected to switch SW-3 114b on egress port A and to switch SW-6 120a on egress port B. The routing table, in some embodiments, includes which egress port of a network node 118 connects to a downstream network node 118. Typically, each network node 118 includes more than one egress port. For example, a network node 118 may include 128 egress ports. Typically, each network node 118 includes a plurality of ingress ports, which may also be listed in the routing table. In other embodiments, each network node 118 includes a table or other data structure that stores information about which downstream network node 118 is connected to each egress port and which upstream network node 118 is connected to each ingress port and an external routing table keeps track of network node connections without port information.

Each egress port of a network node 118 includes two or more queues (e.g. egress queues). In some embodiments, each egress port includes 10 queues. For example, an egress port may use 8 queues for uni-path data transmission and may have 2 queues for multi-path data transmission. Other egress ports have 16 queues or other number of queues. In some embodiments, each queue of an egress port is assigned a priority level. For example, a first queue may be a highest priority queue, a second queue may be a second highest priority queue. Priority of the egress ports is typically used to segregate data packets based on a priority level of the data packets. Typically, some data packets are higher priority than other data packets so that the queues of an egress port allow higher level data packets to be sent before lower level data packets. Sending of data packets from the various queues, in some embodiments, is subject to particular rules to allow prioritizing data packets while ensuring all data packets are sent.

In some embodiments, each data packet includes a header with a Differentiated Services Code Point ("DSCP") field that designates a level of service a packet receives in a network. Typically, a DSCP field is 6 bits. In other data packets include a header that includes a Type of Service ("ToS") field with a 3-bit field for IP Precedence, which is used to identify a level of service. Other networking protocols may use other designation for fields that specify a level of service. Some of the DSCP values include High Priority, Best Effort, AF11, AF12, AF13, AF21, AF22, AF23, AF31, AF32, AF33, AF41, AF42, and AF43, each of which may include a drop probability. The High Priority and Best Effort do not have a drop priority, AF11, AF21, AF31 and AF41 include a low drop probability, AF12, AF22, AF32 and AF42 include a medium drop probability, and AF13, AF23, AF33 and AF43 include a high drop probability. Queues of an egress port, in some embodiments, are assigned to the various DSCP levels of service, IP Precedence values, or other priority level to allow prioritizing of data flow.

In some embodiments, a telemetry routing process used by the apparatuses 200, 300, 400 described below registers with the network nodes 118. As the data network 100 changes, data paths change which may affect routing from a sending host 106 to a receiving host 108, which affects telemetry routing.

The network nodes 118 are connected to a network controller 116. In some embodiments, the network nodes 118 are connected to the network controller 116 over a back channel which is not part of data flow between the sending host 106 and the receiving host 108. In one embodiment, the network controller 116 communicates with the network nodes 118 over network connections that carry data. In other embodiments, the network controller 116 communicates with the network nodes 118 over a side-band or out-of-band connection that is not part of data flow. In some embodiments, the network controller 116 is connected directly to each network node 118. In other embodiments, the network controller 116 is connected indirectly to at least some network nodes 118. One of skill in the art will recognize other ways to connect the network controller 116 to the network nodes 118 and other ways to for the network controller 116 to manage the network nodes 118.

Network connections between the sending host 106 and ingress node 110, the receiving host 108 and egress node 112 and between network nodes 118 may be wired, wireless, fiber connections, and the like. The wireless connection may be a mobile telephone network. The wireless connection may also employ a Wi-Fi network based on any one of the Institute of Electrical and Electronics Engineers ("IEEE") 802.11 standards. Alternatively, the wireless connection may be a BLUETOOTH® connection. In addition, the wireless connection may employ a Radio Frequency Identification ("RFID") communication including RFID standards established by the International Organization for Standardization ("ISO"), the International Electrotechnical Commission ("IEC"), the American Society for Testing and Materials® ("ASTM"®), the DASH7™ Alliance, and EPCGlobal™.

Alternatively, the wireless connection may employ a ZigBee® connection based on the IEEE 802 standard. In one embodiment, the wireless connection employs a Z-Wave® connection as designed by Sigma Designs®. Alternatively, the wireless connection may employ an ANT® and/or ANT+® connection as defined by Dynastream® Innovations Inc. of Cochrane, Canada.

The wireless connection may be an infrared connection including connections conforming at least to the Infrared Physical Layer Specification ("IrPHY") as defined by the Infrared Data Association® ("IrDA"®). Alternatively, the wireless connection may be a cellular telephone network communication. All standards and/or connection types include the latest version and revision of the standard and/or connection type as of the filing date of this application.

As depicted in FIG. 1, each network node 118 includes a telemetry apparatus 102. The telemetry apparatus 102 is described in more detail with regards to FIGS. 2 and 3. The network controller 116 includes a telemetry analysis apparatus 104, which is described with regard to FIG. 4.

The data network 100 depicts only two hosts and a few network nodes 118, however, the data networks 100 is representative of other data networks with more hosts and other devices connected to network nodes as well as data networks with more network nodes in other configurations.

The network nodes 118 are depicted with multiple data paths from the sending host 106 to the receiving host 108. Additional parallel data paths may also exist from the sending host 106 to the receiving host 108. Often, a preferred data path exists from a sending host 106 to a receiving host 108, but other data paths may be used, for example, if the preferred pathway is unavailable, is slow, etc.

Figure 2:
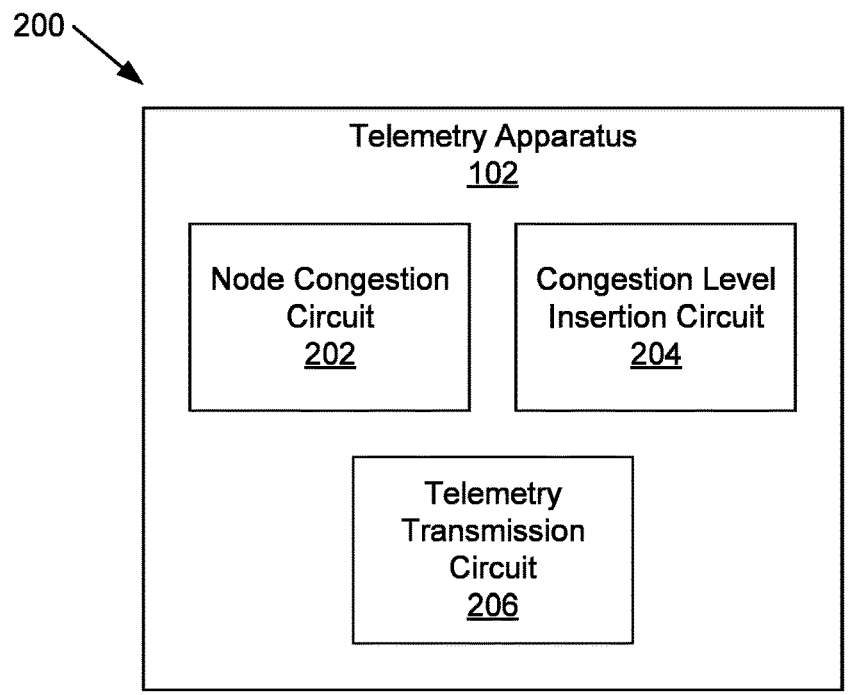
FIG. 2 is a schematic block diagram illustrating one embodiment of a telemetry apparatus for responding to node congestion.

FIG. 2 is a schematic block diagram illustrating one embodiment 200 of a telemetry apparatus 102 for responding to node congestion. In the embodiment, the telemetry apparatus 102 includes a node congestion circuit 202, a congestion level insertion circuit 204 and a telemetry transmission circuit 206, which are described below. In one embodiment, the telemetry apparatus 102 is a controller implemented with hardware circuits. For example, each network node 118 includes hardware circuits that implement the node congestion circuit 202 and the telemetry transmission circuit 206. In other embodiments, at least a portion of the telemetry apparatus 102 is a controller implemented using a programmable hardware device, such as a field programmable gate array or the like. In other embodiments, the telemetry apparatus 102 includes at least a portion that is implemented in program code stored on computer readable storage media on the network nodes 118 and executed by a controller of a network node 118.

The telemetry apparatus 102, in one embodiment, is a controller of a network node 118 that includes a node congestion circuit 202 that is configured to determine a level of congestion of a designated queue of an egress port of the network node in a communication pathway between a sending host 106 sending data packets to a receiving host 108 in response to receiving a telemetry packet seeking telemetry data for packets being transmitted between the sending host 106 and the receiving host 108. The designated queue is designated for queuing data packets for the egress port.

In some embodiments, the controller selects the designated queue that queues data packets based on a header of data packets being transmitted from the sending host 106 to the receiving host 108. In some examples, the controller selects the designated queue based on a priority level within the header of the data packets. The priority levels may be based on DSCP, IP Precedence, or other data packet priority protocol or level of service.

For example, where the header includes a DSCP field, the controller reads the DSCP field and determines a data packet service level and then selects an appropriate designated queue for the selected data packet service level. In some embodiments, the controllers of each of the network nodes 118 selects the same queue for each service level. For example, queue 1 is for High Priority, queue 2 is for Best Effort, queue 3 is for AF11, etc. In other embodiments, the queue for each level of service differs between network nodes 118 and each network node 118 has a mapping between service levels and queues. For example, a network node 118 may include spare queues that are used if a queue fails so that the network node 118 maps a replacement queue to a particular service or the network nodes 118 may be from different manufacturers where each manufacturer designates different queues for the various service levels.

The node congestion circuit 202 determines the node level of congestion of at least the designated queue of the egress port as part of a telemetry process. In one example, the node congestion circuit 202 determines the queue congestion level(s) after the network node 118 receives a telemetry packet. In another example, the network node 118 is an ingress node 110 and the node congestion circuit 202 determines the queue congestion level(s) in response to receiving a command to create and transmit a telemetry packet. In other embodiments, node congestion circuit 202 continuously determines queue congestion level(s), which may be used for a moving average congestion level. One of skill in the art will recognize other triggers for the node congestion circuit 202 to determine queue congestion levels for an egress port.

In some embodiments, node congestion circuit 202 determines the level of congestion of the designated queue by determining how many entries in the queue are filled with data to be sent to a next network node 118. For example, if the designated queue can support 128 data packets and 50 data packets are currently stored in the designated queue, the level of congestion may be 50. In other embodiments, the level of congestion may be classified in another way, such as a percent or a number between a minimum and a maximum. For example, where the designated queue is currently storing 64 data packets out of 128 possible data packet locations, the level of congestion may be 50%. In other embodiments, the percentage representing the level of congestion may be converted to a number so that for a range of zero to 100%, corresponding congestion levels may be 0 to 9 so that a 50% congestion level is coded as a level of congestion of a 4. One of skill in the art will recognize other ways to express a level of congestion based on an amount of data packets in a designated queue.

In some embodiments, the node congestion circuit 202 takes a snapshot of number of stored data packets in a queue for the level of congestion. In other embodiments, the node congestion circuit 202 uses a moving average to determine the level of congestion of the designated queue. In other embodiments, the node congestion circuit 202 includes a register that stores a current level of congestion. One of skill in the art will recognize other ways that the node congestion circuit 202 measures level of congestion of a designated queue.

The telemetry apparatus 102 includes a congestion level insertion circuit 204 that is configured to add the level of congestion to the telemetry packet in response to determining that the level of congestion indicates that the designated queue is congested. In some examples, the congestion level insertion circuit 204 determines that the designated queue is congested by determining that a congestion level of the designated queue is above a congestion threshold. The congestion threshold may be a percentage, a number, a congestion value, etc. The congestion threshold type is correlated to the congestion level type determined by the node congestion circuit 202. For example, if the node congestion circuit 202 determines the congestion level of the designated queue in terms of a percentage, the congestion threshold is also a percentage. In certain embodiments, the congestion threshold is set to 70% and is typically in the range of 50% to 90%. If the determined congestion level is a number in a range, the congestion threshold is a number within the range.

In some embodiments, where the node congestion circuit 202 uses a discrete range of numbers, e.g. 0 to 9, the congestion threshold is set to a level just below a level where the congestion level insertion circuit 204 inserts the congestion level of the designated queue in the telemetry packet. For example, the congestion level may be set to "5" so that a congestion level of "6" will trigger insertion of the congestion level into the telemetry packet. In certain embodiments, a congestion level of 6 corresponds to a congestion threshold of 70% when a range of 0 to 9 is used. In other embodiments, where 3 bits are used to express the level of congestion, a range of 0 to 8 is used and a congestion threshold of 6 corresponds to a level of congestion of 75%. In other embodiments, adding the level of congestion to the telemetry packet in response to determining that the level of congestion indicates that the designated queue is congested occurs when the congestion level determined by the node congestion circuit 202 equals the congestion threshold.

In some embodiments, the congestion level insertion circuit 204 sets a congestion bit in response to the determined level of congestion begin above the congestion threshold. The congestion bit being set, in some embodiments, triggers adding congestion data to the telemetry packet.

In some embodiments, the node congestion circuit 202 expresses a level of congestion as queue identifier ("ID") and a congestion level. In one example, the node congestion circuit 202 uses a byte of data for a level of congestion where four bits are used for the queue ID, which allows up to 16 queues to be identified. The node congestion circuit, in some embodiments, expresses the level of congestion with three bits, with congestion levels between 0 and 8. One bit of the level congestion byte is reserved. In other embodiments, the node congestion circuit 202 uses four bits for the level of congestion. The node congestion circuit 202 converts various levels of congestion to an integer value. For example, 15% congestion could be encoded as 2. Other embodiments include more than one byte for expressing a level of congestion for a queue. One of skill in the art will recognize other ways to trigger the congestion level insertion circuit 204 to insert the congestion level of the designated queue in the telemetry packet.

In some embodiments, the node congestion circuit 202 determines the congestion level of more than one queue of the egress port and the congestion level insertion circuit 204 adds the congestion level of more than one queue of the egress port to the telemetry packet along with a queue ID for each level of congestion. In one example, the node congestion circuit 202 determines a congestion level for all queues of the egress port and the congestion level insertion circuit 204 adds the congestion level and queue ID of all of the queues of the egress port to the telemetry packet. In other embodiments, the congestion level insertion circuit 204 adds the levels of congestion is a particular order that represents the queue IDs.

In another example, the node congestion circuit 202 determines a congestion level for a group of queues of the egress port and the congestion level insertion circuit 204 adds the congestion level of the group of queues of the egress port to the telemetry packet. The group, in some embodiments, includes queues that correlate to priority levels where other queues not correlating to priority levels are not in the group. In other embodiments, the group includes queues that are being used where others are reserved for future use or are otherwise not being used by the network node 118. In other embodiments, the group includes a certain number of queues in addition to the designated queue. For example, the group may include the designated queue and three additional queues of the egress port. One of skill in the art will recognize other ways to select which queues of the egress port for the node congestion circuit 102 to select for determination of a level of congestion and/or which queues of the egress port have a determined congestion level included in the telemetry packet by the congestion level insertion circuit 204.

In some embodiments, congestion level insertion circuit 204 adds an identifier for the network node 118 with the level(s) of congestion. In other embodiments, the congestion level insertion circuit 204 places the level(s) of congestion in a data field associated with the network node 118 with the congested designated queue so that it is apparent from reading the data which network node 118 has a congested designated queue.

In one embodiment, the congestion level insertion circuit 204 selects a new designated queue based on level of congestion data of queues of the egress port and automatically reroutes data packets to the new designated queue. Where the congestion level insertion circuit 204 selects a new designated queue, the congestion level insertion circuit 204 also adds the selected new designated queue to the telemetry packet.

The telemetry apparatus 102 includes a telemetry transmission circuit 206 that is configured to transmit the telemetry packet to a next destination on the communication pathway. In one embodiment, the telemetry transmission circuit 206 transmits the telemetry packet in response to the congestion level insertion circuit 204 adding the congestion level information of the queue(s) of the egress port to the telemetry packet or determining that the congestion level of the designated queue is such that the designated queue is not congested.

Figure 3:
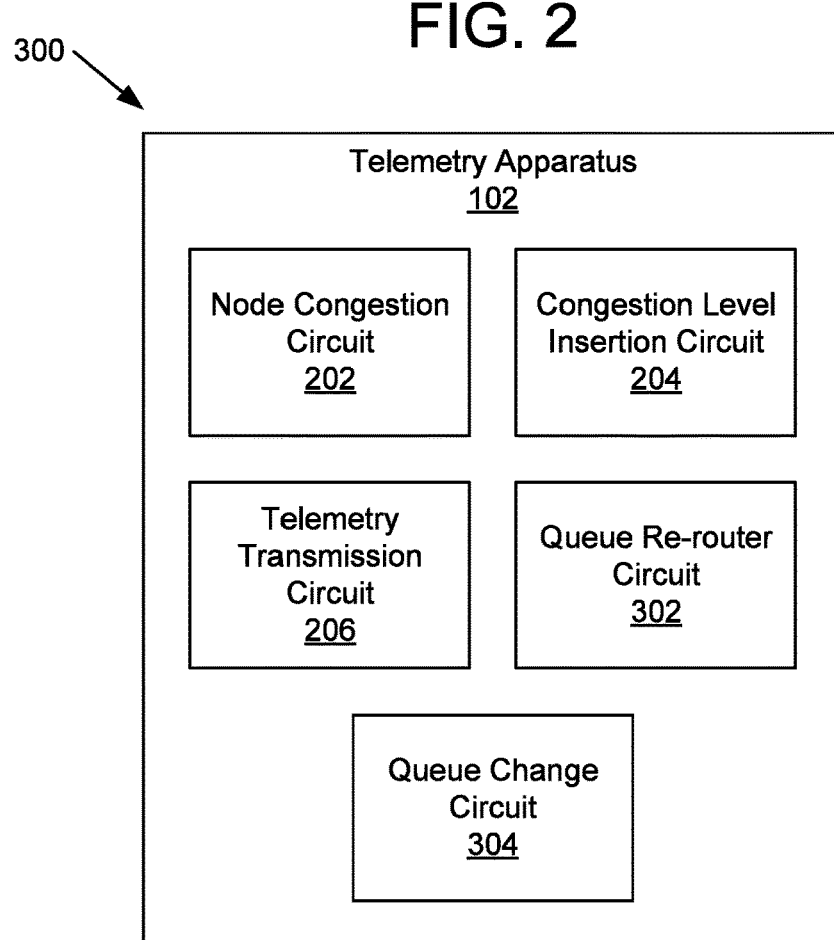
FIG. 3 is a schematic block diagram illustrating another embodiment of a telemetry apparatus for responding to node congestion.

FIG. 3 is a schematic block diagram illustrating another embodiment 300 of a telemetry apparatus 102 for responding to node congestion. In the embodiment 300, the telemetry apparatus 102 includes a controller with a node congestion circuit 202, a congestion level insertion circuit 204 and a telemetry transmission circuit 206, which are substantially similar to those of the controller of the telemetry apparatus 102 of the embodiment 200 in FIG. 2. The telemetry apparatus 102 of the embodiment 300 also includes a queue re-router circuit 302 and a queue change circuit 304, which are described below.

The telemetry apparatus 102 includes a queue re-router circuit 302 configured to receive a command to reroute data packets being transmitted between the sending host 106 and the receiving host 108 from the designated queue to a different queue of the egress port. The telemetry apparatus 102 includes a queue change circuit 304 configured to redirect data packets from the designated queue to the different queue of the egress port in response to receiving the command to reroute data packets being transmitted between the sending host 106 and the receiving host 108 to the different queue.

In one embodiment, the command to reroute the data packets being transmitted between the sending host 106 and the receiving host 108 includes receiving an additional data packet being transmitted from the sending host 106 to the receiving host 108 with a packet header designating the different queue. For example, the header may include a different priority level than previous headers. In some embodiments, the network controller 116 sends a command to the sending host 106 to change the priority level in data packets being transmitted between the sending host 106 and the receiving host 108 and after the sending host 106 changes the priority level in the packet headers, the network node 118 receives data packets with the changed header that includes a different priority level. In some embodiments, the packet header designating the different queue includes a DSCP field in the header of each of the additional data packet with a different priority level than a DSCP priority level designating the designated queue. Where the network controller 116 sends a command to the sending host 106 to change the priority level of data packets, the queue change circuits 304 of each network node 118 receiving data packets with the new priority level will redirect data packets from the designated queue to the different queue.

The network controller 116 sending a command the sending node 106 to change a level of service or priority level of data packets being transmitted from the sending node 106 to the receiving node 108 to change from the designated queue to a different non-congested queue is advantageous because switching to a different non-congested queue can speed up transmission of the data packets. In addition, the network controller 116 sending a command the sending node 106 to change queues in some instances does not require a change to hardware of the network nodes. However, the network controller 116 sending a command the sending node 106 to change to a different queue initiates a change to a different queue for all network nodes 118 and may initiate a change to the service level of the data packets.

In another embodiment, the command to reroute the data packets being transmitted between the sending host 106 and the receiving host 108 includes receiving a command from a network controller 116 to change from the designated queue to a different queue for the egress port. In some embodiments, the network node 118 receives the command directly from the networking controller 116. In some embodiments, the network controller 116 sending the command is a same network controller 116 that initiated the telemetry packet and the network controller 116 communicates directly the command to the network node 118 to change from the designated queue to a different queue of the egress port.

For example, the networking controller 116 may receive a telemetry packet with a level of congestion indicating that a particular network node 118 (e.g. SW-2 114*a*) has a designated queue that is congested for the egress port. In response, the network controller 116 sends a command to SW-2 114*a* to switch from the designated queue to the different queue, which is received by the queue re-router circuit 302. The queue change circuit 304 then changes the designated queue of the egress port of SW-2 114a to the different queue. Note that in this embodiment, the other network nodes 118, other than SW-2 114a, keep sending data packets to a current designated queue of their respective egress ports.

Changing from the designated queue to the different queue of the network node 118 that is congested while maintaining use of the designated queue for the other network nodes 118, in some instances, is advantageous. For example, if the data packets sent from the sending host 106 to the receiving host 108 use DSCP and the level of service is High Priority, the network nodes 118 other than the network node that is congested (e.g. SW-2 114a) are able to continue with a designated queue corresponding to High Priority while only the congested node SW-2 114a has data packets directed to a different queue that may be a lower level of service.

Figure 4:
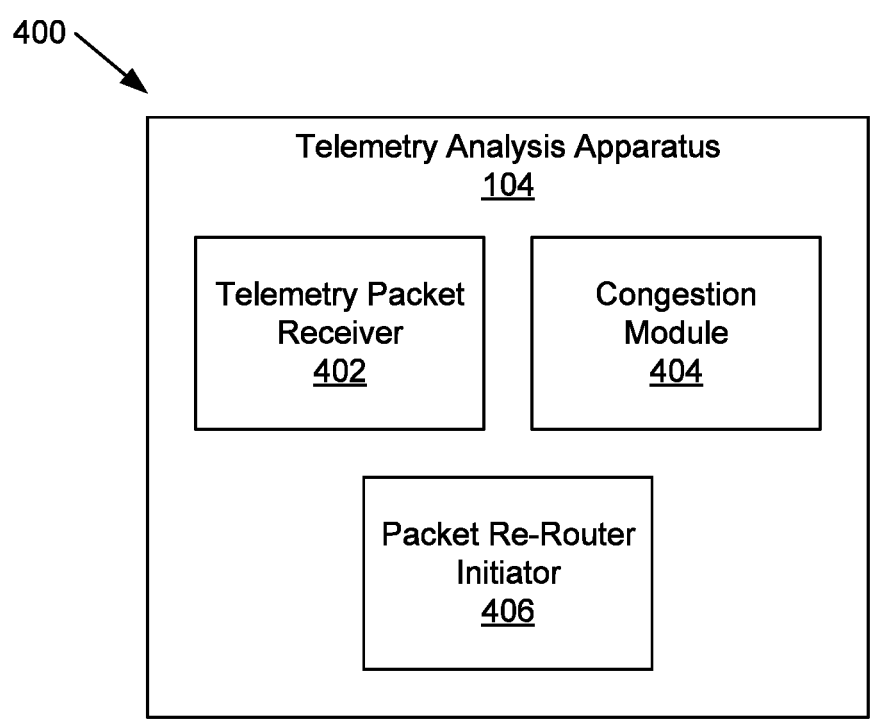
FIG. 4 is a schematic block diagram illustrating one embodiment of a telemetry analysis apparatus.

FIG. 4 is a schematic block diagram illustrating one embodiment 400 of a telemetry analysis apparatus 104. In the embodiment 400, the telemetry analysis apparatus 104 includes a telemetry packet receiver 402, a congestion module 404 and a packet re-router initiator 406, which are described below.

In some embodiments, the telemetry analysis apparatus 104 is at least partially implemented with program code, which is stored on computer readable storage media. For example, the program code may be a computer program product that includes a computer readable storage medium and program code. The program code is configured to be executable by a processor. For example, the program code is stored on computer readable storage media accessible to the processor of the network controller 116. The computer readable storage media may include volatile memory of the network controller 116 and may also include non-volatile memory, such as flash memory, a hard disk drive, and optical drive, etc. accessible to the network controller 116.

In other embodiments, the telemetry analysis apparatus 104 is implemented on a programmable hardware device. For example, the network controller 116 may include an FPGA, programmable array logic, etc. that includes the telemetry analysis apparatus 104. In other embodiments, all or a portion of the telemetry analysis apparatus 104 is implemented with hardware circuits. For example, the telemetry analysis apparatus 104 may be implemented using an application specific integrated circuit ("ASIC"), VLSI circuits or other device with hardware circuits. In other embodiments, the telemetry analysis apparatus 104 is implemented using hardware circuits, a programmable hardware device and/or program code.

The telemetry analysis apparatus 104 includes a telemetry packet receiver 402 configured to receive a telemetry packet from an egress network node 112. The egress network node 112 is connected to a receiving host 108 where the egress network node 112 is within a communication pathway between a sending host 106 and the receiving host 108. Data packets being transmitted from the sending host 106 to the receiving host 108 are queued in the designated queue.

In some examples, the networking controller 116 sends a command to initiate sending a telemetry packet along the communication pathway where the telemetry packet is created or inserted at an ingress node 110 and then transmitted to each transit node 114 until the telemetry packet reaches the egress node 112, where the telemetry packet is then transmitted to the network controller 116. Where a network node 118 has a designated queue that is congested, the telemetry apparatus 102 of the network node 118 adds a level of congestion of the designated queue, and possibly other queues to the telemetry packet. Once the telemetry packet reaches the network controller 116, the telemetry packet is received by the telemetry packet receiver 402.

The telemetry analysis apparatus 104 includes a congestion module 404 that is configured to determine that the telemetry packet indicates that a designated queue of an egress port of a network node 118 in the communication pathway is congested. In one example, the telemetry packet includes a field that includes a level of congestion and which network node 118 is congested. In some embodiments, the telemetry packet includes a level of congestion and the congestion module 404 determines if the level of congestion indicates that the level of congestion for the network node 118 indicates that the designated queue is congested. For example, the congestion module 404 may compare the level of congestion to a congestion threshold. In other embodiments, the telemetry packet includes a congestion bit that is set when the designated queue for the network node 118 is congested and the congestion module 404 reads the congestion bit for the network node 118. In some embodiments, the telemetry packet includes information indicating that two or more network nodes 118 have a designated queue that is congested.

The telemetry analysis apparatus 104 includes a packet re-router initiator 406 that is configured to send a command to the network node 118 to change a data flow of data packets from the designated queue to a different queue of the egress port such that data packets from transmitted between the sending host 106 and the receiving host 108 are queued in the different queue. In some embodiments, the packet re-router initiator 406 sends a command to the sending host 106 where the command modifies headers of data packets transmitted from sending host 106 to the receiving host 108 to change the data flow from the designated queue to the different queue. In one example, the command changes a priority level of the data packets by changing the level of service of a DSCP field, changing an IP Precedence value, etc. In the example, each network node 118 along the communication pathway switches the data flow from the designated queue to the different queue.

In some embodiments, the telemetry packet includes a level of congestion for the designated queue and other queues of the egress port of the network node 118 and the command designates a particular queue that is not congested. In one example, the command changes from a priority level corresponding to the designated queue to a different priority level that includes a queue that is not congested.

In some embodiments, the packet re-router initiator 406 sends the command directly to the network node 118 with the congested designated queue (e.g. SW-2 114a). In the embodiment, the command directs the network node (SW-2 114a) with the congested designated queue to change the data flow of the data packets to the different queue. Where the packet re-router initiator 406 sends the command directly to the congested network node SW-2 114a, network nodes 118 within the communication pathway other than the network node SW-2 114a with the congested designated queue continue to direct data packets to the designated queue of network node's respective egress port. In an example where the telemetry packet indicates that two or more network nodes 118 have a congested designated queue, the packet re-router initiator 406 sends a command to each network node 118 with a congested designated queue to change the data flow to a different non-congested queue.

Note that the current designated queue and the new designated queue are for the particular data packets being sent from the sending host 106 to the receiving host 108 on the communication pathway and other data packets for other communication pathways have different priorities, may use different queues, use different egress ports, etc. A data packet header typically includes a 5-tuple (IP Dst, IP Src, Protocol, Src Port, Dst Port) where IP Dst is the IP address of the destination or receiving host 108, IP Src is the IP address of the source or sending host 106, protocol is the particular protocol of the data packets, Src Port is the port used by the sending host 106, and Dst Port is the port used by the receiving host 108. Once this header is read and identifies that the data packet is being transmitted from the sending host 106 to the receiving host 108, the data packet can then be parsed to identify a level of service, which then is used to identify a designated queue of the egress port of the particular network node 118 that received the data packet.

In some embodiments, the packet re-router initiator 406 directs the network node (SW-2 114a) which queue to use for the new designated queue. For example, the telemetry packet received by the telemetry packet receiver 402 may include congestion data for some or all queues of the egress port of the network node (SW-2 114a) and the packet re-router initiator 406 picks a non-congested queue of the egress port as the new designated queue. In other embodiments, the packet re-router initiator 406 directs the network node (SW-2 114a) to change the designated queue with no choice of queue and the network node (SW-2 114a) selects a new designated queue that is not congested.

In some embodiments, the packet re-router initiator 406 sends the command using a network management protocol different than a networking protocol for transmitting data packets. For example, the packet re-router initiator 406 may send the command using REST™, NETCONF™, SNMP™, gRPC®, OpenFlow®, or the like to the congested network node SW-2 114a.

Figure 5:
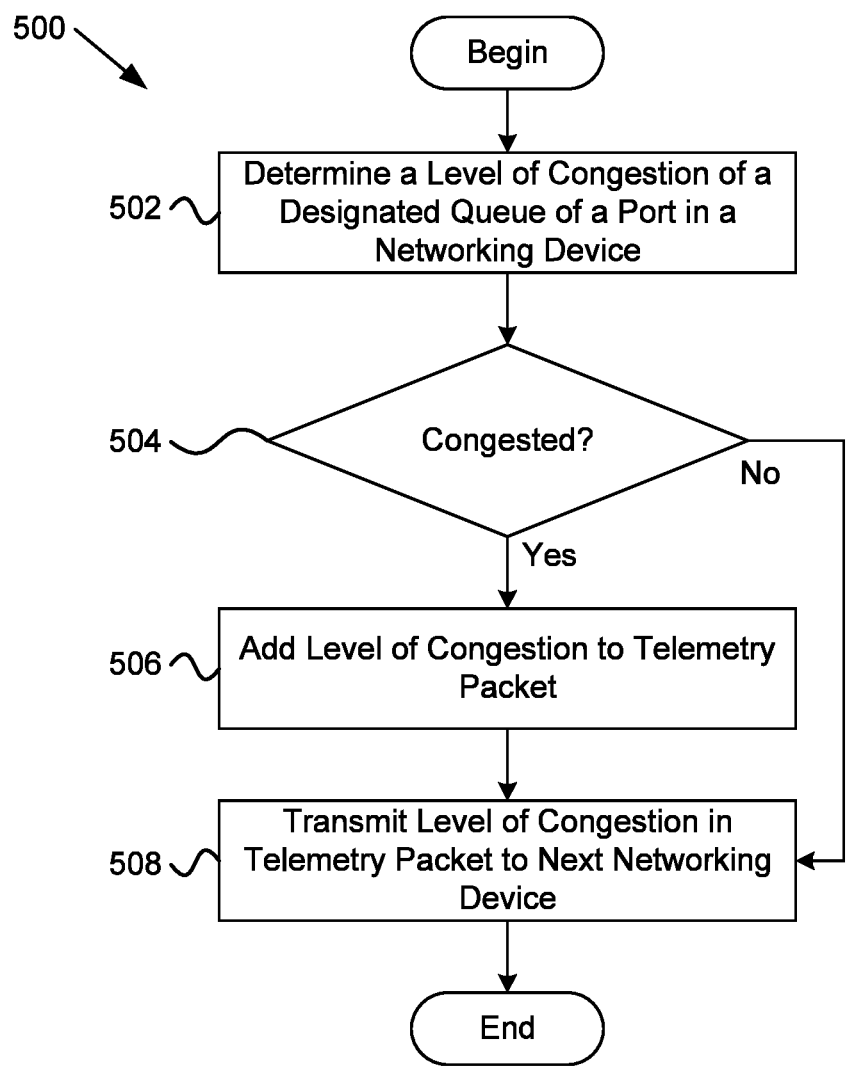
FIG. 5 is a schematic flow chart diagram illustrating one embodiment of a method for determining node congestion in a network node and transmitting a telemetry packet with a level of congestion.

FIG. 5 is a schematic flow chart diagram illustrating one embodiment of a method 500 for determining node congestion in a network node 118 and transmitting a telemetry packet with a level of congestion. The method 500 begins and determines 502 a level of congestion of a designated queue of an egress port of a network node 118 transmitting data packets from a sending host 106 to a receiving host 108 in a communication pathway. In some embodiments, the method 600 determines 502 the level of congestion in response to receiving a telemetry packet, or in response to generating a telemetry packet. For example, the network node 118 may be an ingress node 110, which may generate a telemetry packet in response to a command to initiate gathering telemetry data.

The method 500 determines 504 if the designated queue of the egress port is congested. If the method 500 determines 504 that the designated queue is congested, the method 500 adds 506 the level of congestion to the telemetry packet and transmits 508 the telemetry packet to a next destination in the communication pathway, and the method 500 ends. If the method 500 method 500 determines 504 that the designated queue is not congested, the method 500 transmits 508 the telemetry packet to a next destination on the communication pathway without including level of congestion information, and the method 500 ends. In various embodiments, portions or all of the method 500 are implemented by a controller in a network node 118 with a telemetry apparatus 102, which may include one or more of a node congestion circuit 202, a congestion level insertion circuit 204 and a telemetry transmission circuit 206.

Figure 6:
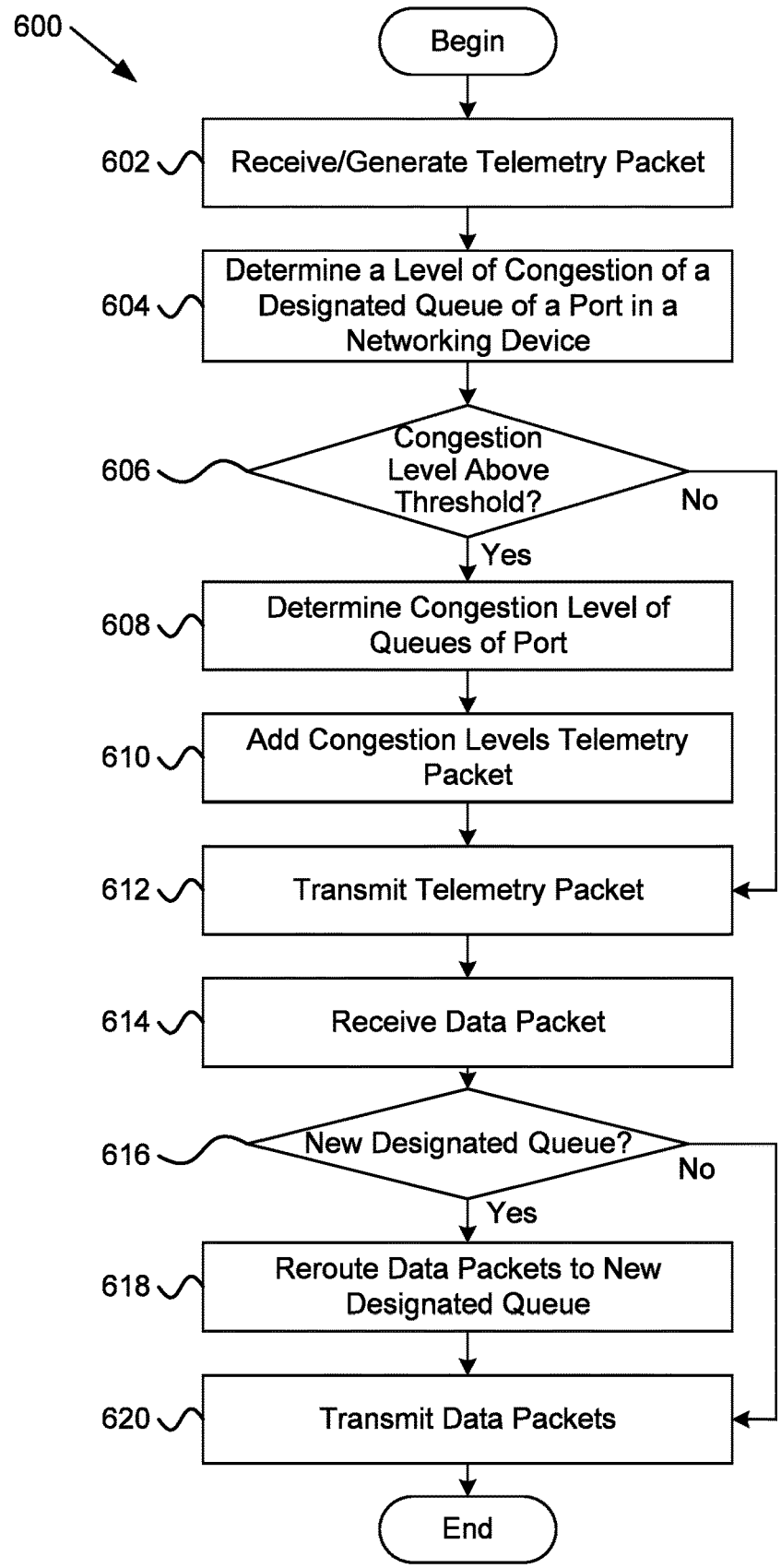
FIG. 6 is a schematic flow chart diagram illustrating another embodiment of another method for determining node congestion in a network node and transmitting a telemetry packet with a level of congestion.

FIG. 6 is a schematic flow chart diagram illustrating another embodiment of another method 600 for determining node congestion in a network node 118 and transmitting a telemetry packet with a level of congestion. The method 600 begins and receives or generates 602 a telemetry packet. If the network node 118 is an ingress node 110, the ingress node 110 could generate 602 a telemetry packet either by copying and modifying a data packet being transmitted from the sending host 106 to the receiving host 108 or by creating a telemetry packet by creating a header and a payload. If the network node 118 is a transit node 114, the network node 118 receives 602 the telemetry packet from the network node 118 upstream in the communication pathway from the sending host 106 to the receiving host 108.

The method 600 determines 604 a level of congestion of a designated queue of an egress port of the network node 118 in the communication pathway. The method 600, in some embodiments, determines 604 a level of congestion by looking at how full is the designated queue by determining a level of data packets currently stored in the designated queue with respect to an available capacity of the designated queue. In other embodiments, the method 600 determines a level of congestion using a moving average. In other embodiments, the method 600 determines the level of congestion by reading a level of congestion from a congestion register.

The method 600 determines 606 if the level of congestion is above a congestion threshold. If the method 600 determines 606 that the level of congestion is above the congestion threshold, the method 600 determines 608 a level of congestion of other queues of the egress port. In some embodiments, the method 600 determines 608 a level of congestion of all queues of the egress port. In other embodiments, the method 600 determines 608 a level of congestion of a group of queues of the egress port. The method 600 adds 610 the determined levels of congestion to the telemetry packet and transmits 612 the telemetry packet to the next network node 118 of the communication pathway. If the method 600 determines 606 that the level of congestion of the designated queue is not above the congestion threshold, the method 600 transmits 612 the telemetry packet without congestion information.

The method 600 receives 614 a data packet being transmitted from the sending host 106 to the receiving host 108 and determines 616 if a header of the data packet specifies a new designated queue for the egress port. For example, the DSCP field in the header may designate a different level of service for the data packet. If the method 600 determines 616 that the header of the data packet specifies a new designated queue, the method 600 reroutes 618 data packets being transmitted from the sending host 106 to the receiving host 108 to the new designated queue and transmits 620 the data packet to the next network node 118 in the communication pathway, and the method 600 ends. If the method 600 determines 616 that the header of the data packet does not specify a new designated queue, the method 600 transmits 620 the data packet to the next network node 118 in the communication pathway, and the method 600 ends. In some embodiments, the method 600 is implemented using the node congestion circuit 202, the congestion level insertion circuit 204, the telemetry transmission circuit 206, the queue re-router circuit 302 and/or the queue change circuit 304 of a controller of the network node 118.

Figure 7:
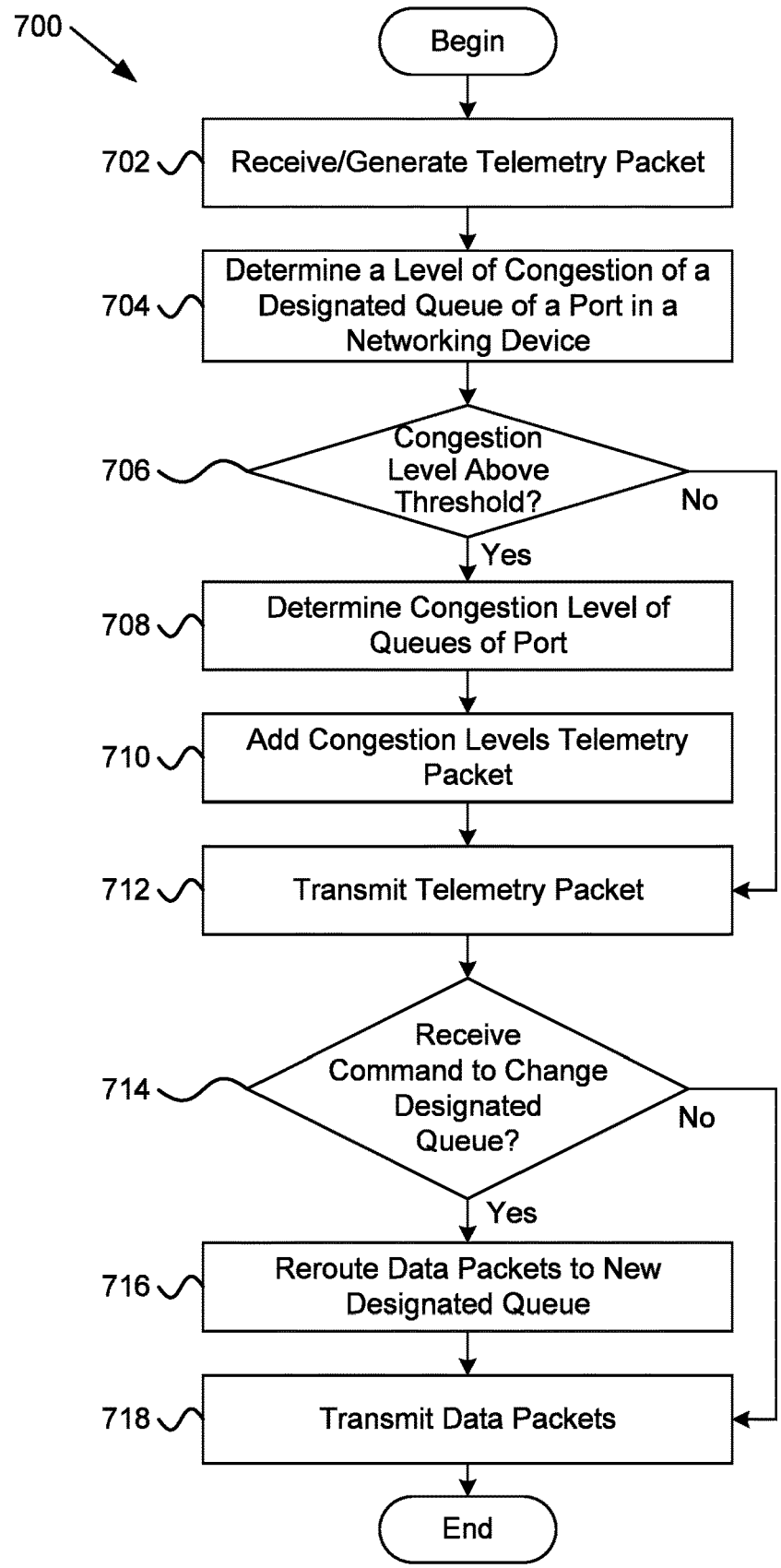
FIG. 7 is a schematic flow chart diagram illustrating a third embodiment of a method for determining node congestion in a network node and transmitting a telemetry packet with a level of congestion.

FIG. 7 is a schematic flow chart diagram illustrating a third embodiment of a method 700 for determining node congestion in a network node 118 and transmitting a telemetry packet with a level of congestion. The method 700 begins and receives/generates 702 a telemetry packet. The method 700, in some embodiments, determines 704 a level of congestion by looking at the designated queue to determine a level of data packets in the designated queue with respect to a capacity of the designated queue. The method 700 may read a moving average of the level of congestion, may read a value of a congestion register, etc. to determine 606 the level of congestion of the designated queue.

The method 700 determines 706 if the level of congestion is above a congestion threshold. If the method 700 determines 706 that the level of congestion is above the congestion threshold, the method 700 determines 708 a level of congestion of other queues of the egress port. In some embodiments, the method 700 determines 708 a level of congestion of all queues of the egress port. In other embodiments, the method 700 determines 708 a level of congestion of a group of queues of the egress port. The method 700 adds 710 the determined levels of congestion to the telemetry packet and transmits 712 the telemetry packet to the next network node 118 of the communication pathway. If the method 700 determines 706 that the level of congestion of the designated queue is not above the congestion threshold, the method 700 transmits 712 the telemetry packet without congestion information.

The method 700 determines 714 if a command has been received to change the designated queue. In some embodiments, the method 700 receives the command to change the designated queue from the network controller 116, for example, in response to the network controller 116 determining that a received telemetry packet regarding data packets send along the communication pathway includes a level of congestion for the designated queue of the egress port of the network node 118 that is above a congestion threshold. If the method 700 determines 714 that a command has been received to change the designated queue, the method 700 reroutes 716 data packets being transmitted from the sending host 106 to the receiving host 108 to a new designated queue and transmits 718 the data packet to the next network node 118 in the communication pathway, and the method 700 ends. If the method 700 determines 714 that the header of the data packet does not specify a new designated queue, the method 700 transmits 718 the data packet to the next network node 118 in the communication pathway, and the method 700 ends. In some embodiments, the method 700 is implemented using the node congestion circuit 202, the congestion level insertion circuit 204, the telemetry transmission circuit 206, the queue re-router circuit 302 and/or the queue change circuit 304 of a controller of the network node 118.

Figure 8:
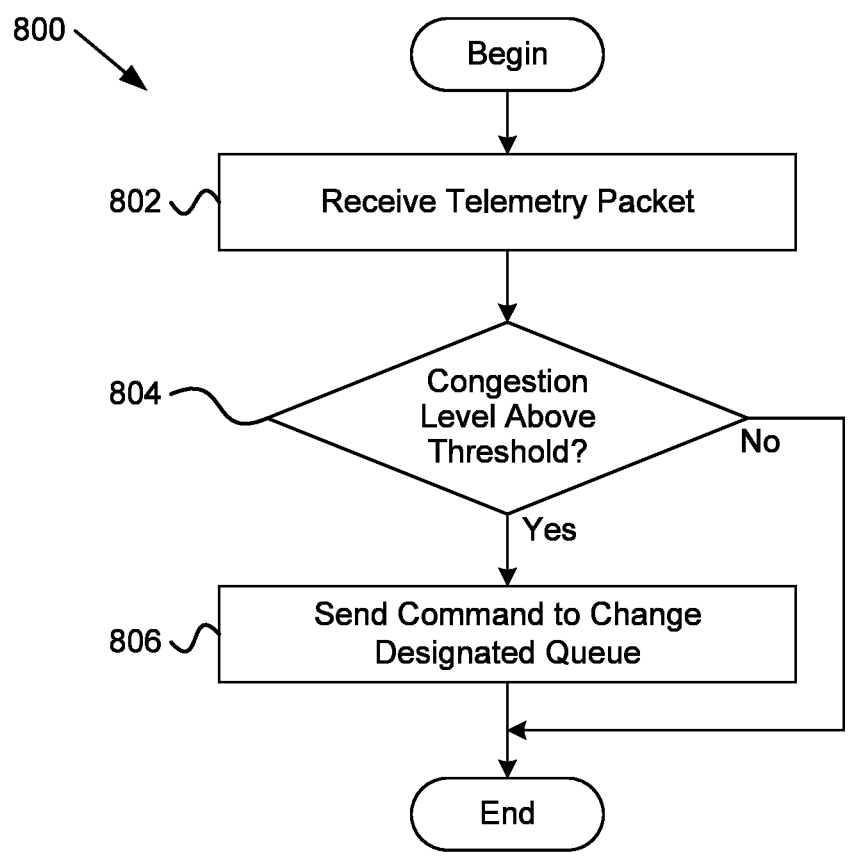
FIG. 8 is a schematic flow chart diagram illustrating one embodiment of a method for determining a level of congestion of a queue in a network node and sending a command to change a designated queue.

FIG. 8 is a schematic flow chart diagram illustrating one embodiment of a method 800 for determining a congestion level of a queue in a network node 118 and sending a command to change a designated queue. The method 800 begins and receives 802 a telemetry packet for a communication pathway for data packets being sent from a sending host 106 to a receiving host 108. The method 800 determines 804 if the telemetry packet includes a level of congestion for a network node 118 in the communication pathway that is above a congestion threshold. If the method 800 determines 804 that the telemetry packet does not include a level of congestion for a network node 118 in the communication pathway that is above a congestion threshold, the method 800 ends.

If the method 800 determines 804 that the telemetry packet includes a level of congestion for a network node 118 in the communication pathway that is above a congestion threshold, the method 800 sends 806 a command to change the designated queue to a different queue of the egress port of the network node 118, and the method 800 ends. In some embodiments, the telemetry packet includes a level of congestion for more than one queue of the egress port of the network node 118 and the command designates a non-congested queue of the egress port to be the new designated queue.

In some embodiments, the method 800 transmits 806 the command to the sending host 106 with an instruction to change headers of data packets being transmitted from the sending host 106 to the receiving host 108 to have a different priority level, which changes the designated queue of the network nodes 118 along the communication pathway. In other embodiments, the method 800 transmits 806 the command to change the designated queue directly to the network node 118 with the congested designate queue. The command transmitted 806 directly to the network node 118 with the congested designated queue, in some embodiments, specifies which queue of the egress port will be the new designated queue. The method 800, in some embodiments, is implemented using the telemetry packet receiver 402, the congestion module 404 and/or the packet re-router initiator 406.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a network node comprising a controller, the controller configured to:
determine a level of congestion of a designated queue of an egress port of the network node in a communication pathway between a sending host sending data packets to a receiving host in response to receiving a telemetry packet seeking telemetry data for packets being transmitted between the sending host and the receiving host, the designated queue designated for queuing data packets for the egress port;
add the level of congestion to the telemetry packet in response to determining that the level of congestion indicates that the designated queue is congested; and
transmit the telemetry packet to a network controller in response to the network node being an egress node connected directly to the receiving host and transmit the telemetry packet to a next destination on the communication pathway in response to the network node being a node in the communication pathway other than the egress node.

2. The apparatus of claim 1, wherein the controller is further configured to determine a level of congestion of a plurality of queues of the egress port and the controller adds a level of congestion of each of the plurality of queues of the egress port to the telemetry packet.

3. The apparatus of claim 1, wherein the controller determines the designated queue for queuing data packets based on a header of data packets being transmitted from the sending host to the receiving host.

4. The apparatus of claim 3, wherein the controller determines the designated queue of the egress port from a Differentiated Services Code Point ("DSCP") field in the header of the data packets.

5. The apparatus of claim 1, wherein the controller is further configured to:
receive a command to reroute data packets being transmitted between the sending host and the receiving host from the designated queue to a different queue of the egress port; and
redirect data packets from the designated queue to the different queue of the egress port in response to receiving the command to reroute data packets being transmitted between the sending host and the receiving host to the different queue.

6. The apparatus of claim 5, wherein the command to reroute the data packets being transmitted between the sending host and the receiving host comprises receiving an additional data packet being transmitted from the sending host to the receiving host with a packet header designating the different queue.

7. The apparatus of claim 6, wherein the packet header designating the different queue comprises a DSCP field in the header of each of the additional data packet with a different priority level than a DSCP priority level designating the designated queue.

8. The apparatus of claim 5, wherein the command to reroute a data flow of the data packets being transmitted between the sending host and the receiving host comprises receiving the command from the network controller to change the data flow from the designated queue to a different queue for the egress port.

9. The apparatus of claim 8, wherein the network controller sending the command is the same network controller that initiated the telemetry packet and the network controller communicates directly the command to the network node to change the data flow from the designated queue to a different queue of the egress port.

10. The apparatus of claim 1, wherein determining the designated queue is congested comprises determining that a level of congestion of the designated queue meets or exceeds a congestion threshold.

11. The apparatus of claim 1, wherein determining the level of congestion of the designated queue comprises determining that the level of congestion is a value between a minimum congestion level and a maximum congestion level wherein the level of congestion comprises a percentage between zero percent and 100 percent.

12. A method comprising:
receiving, by use of a processor of a network controller, a telemetry packet from an egress network node, the egress network node connected to a receiving host, wherein the egress network node is one of a plurality of network nodes within a communication pathway between a sending host and the receiving host, wherein a data flow of data packets being transmitted from the sending host to the receiving host are queued in a designated queue of an egress port of a network node of the plurality of network nodes in the communication pathway;
determining, by use of a processor of the network controller, that the telemetry packet indicates that the designated queue is congested; and
sending, from the network controller, a command to the network node with the congested designated queue to change the data flow from the designated queue to a different queue of the egress port such that data packets from transmitted between the sending host and the receiving host are queued in the different queue.

13. The method of claim 12, wherein sending the command comprises sending the command to the sending host, wherein the command modifies headers of data packets transmitted from sending host to the receiving host to change the data flow from the designated queue to the different queue.

14. The method of claim 13, wherein each network node of the plurality of network nodes along the communication pathway switches from the designated queue to the different queue.

15. The method of claim 13, wherein modifying the headers comprises modifying a service level in a Differentiated Services Code Point ("DSCP") field of the headers.

16. The method of claim 12, wherein sending the command comprises sending the command directly to the network node with the designated queue that is congested, wherein the command directs the network node with the designated queue that is congested to change the data flow to the different queue.

17. The method of claim 16, wherein network nodes of the plurality of network nodes within the communication pathway other than the network node of the plurality of network nodes with the designated queue that is congested continue to direct data packets to the designated queue of the network node's respective egress port.

18. The method of claim 16, wherein sending the command comprises sending the command using a network management protocol different than a networking protocol for transmitting data packets.

19. The method of claim 12, wherein the received telemetry packet includes a level of congestion of a plurality of queues of the egress port and sending the command comprises sending the command to change the data flow from the designated queue of the egress port to a different queue of the egress port that is not congested.

20. A program product comprising a non-volatile computer readable storage device with program code, the program code being configured to be executable by a processor to perform operations comprising:
receiving, at a network controller, a telemetry packet from an egress network node, the egress network node connected to a receiving host, wherein the egress network node is one of a plurality of network nodes within a communication pathway between a sending host and the receiving host, wherein a data flow of data packets being transmitted from the sending host to the receiving host are queued in a designated queue of an egress port of a network node of the plurality of network nodes in the communication pathway;
determining that the telemetry packet indicates that the designated queue is congested; and
sending a command to the network node with the congested designated queue to change the data flow from the designated queue to a different queue of the egress port such that data packets from transmitted between the sending host and the receiving host are queued in the different queue.

* * * * *